United States Patent Office 3,508,907
Patented Apr. 28, 1970

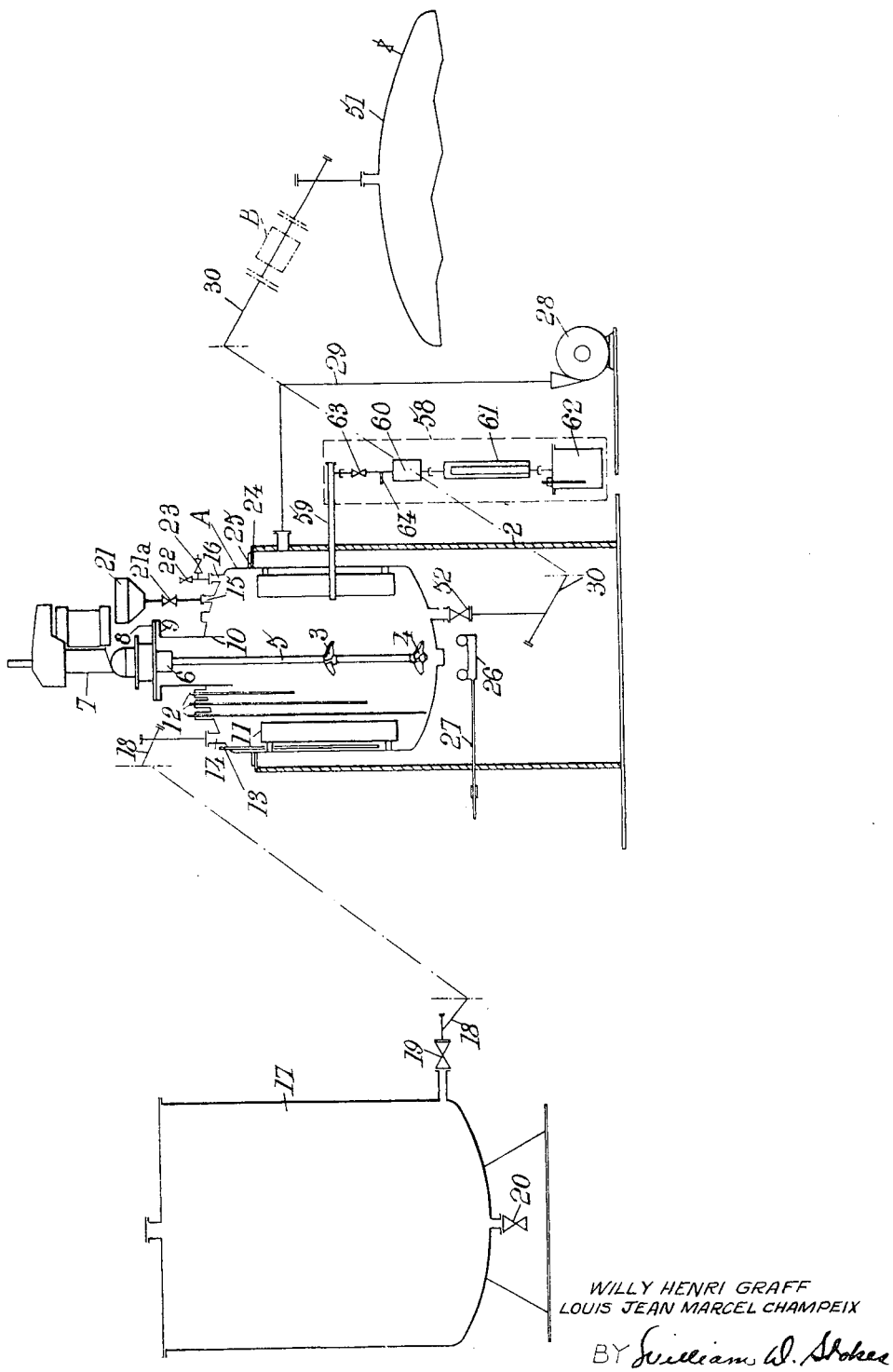

3,508,907
MEANS FOR PURIFYING SODIUM
Willy Henri Graff, Grenoble, and Louis Jean Marcel Champeix, Sceaux, France, assignors to Commissariat a l'Energie Atomique, Paris, France
Filed Dec. 28, 1966, Ser. No. 605,450
Claims priority, application France, Dec. 30, 1965, 44,383
Int. Cl. C22b 27/00
U.S. Cl. 75—66
8 Claims

ABSTRACT OF THE DISCLOSURE

The invention pertains to the purification of commercial sodium containing minor amounts of calcium and/or barium. The sodium is treated with minor amounts of sodium peroxide at a temperature ranging from about 150° C. to about 300° C. At the end of this treatment, the solid precipitate containing calcium oxide and/or barium oxide is removed by filtration. The purified sodium contains less than 10 p.p.m. of calcium or of barium.

---

This invention relates to methods of the kind used in purifying commercially available electrolytic sodium, that is to say methods enabling the sodium to be rid of calcium, in particular, to an extent such as to make it fit for use in installations in which nuclear reactions take place.

The present invention has for its object to provide improved methods for purifying sodium, and accordingly consists in processing the sodium with sodium peroxide while sustaining a powerful agitation, at a temperature of about 150 to 300 degrees centigrade, and preferably of 200 to 300 degrees centigrade, and in then separating by filtration the calcium oxide formed.

The description which follows with reference to the accompanying non-limitative exemplary drawing will give a clear understanding of how the invention can be carried into practice.

The single figure in the drawing is a diagrammatic sectional view of an apparatus devised for carrying out the invention.

Before describing the invention in greater detail, it should be recalled that commercially available sodium, which is usually obtained by electrolyzing binary or ternary mixtures containing calcium chloride and possibly also barium chloride, contains notably 300 to 500 p.p.m. of calcium, essentially in the metallic form, which, when the sodium is used as a heat transfer agent in atomic piles and the like, acts as a de-oxidizer, i.e. it causes the formation of lime which can deposit inside the circuits and clog the same.

Experience shows that the upper limit for the calcium content of sodium suitable for use in such piles is about 10 p.p.m.

It has already been proposed to rid commercially available electrolytic sodium of the calcium it contains by oxydizing the latter with sodium oxide at temperatures ranging from 400 to 600° C.

However, in the production of sodium of nuclear purity, the performance of this oxidation reaction is practically impossible due to the high temperatures required which themselves involve important costs and at which corrosive activity of the sodium is enhanced to such an extent that the alloys constituting the reaction apparatuses are not capable of withstanding it.

To overcome such difficulties, it has already been proposed to oxidize the calcium remaining in the sodium by insufflating a gaseous mixture of an inert gas and of oxygen, whereby the reaction temperatures could be lowered down to a temperature less than 300° C. This latter process, however, involves considerable difficulties from the standpoint of its practical operation, due to the complexity of the required equipment to ensure not only a sufficient good metal-gas contact but also to enable the recycling of the gaseous mixture (the volume of gas required being also considerable), the continuous analysis thereof and the continuous and controlled supply of oxygen therein to restore the initial proportion of this last gas in the reacting gaseous mixture.

In addition thereto great difficulties have arisen due to the frequent clogging of the insufflating devices.

It is the object of this invention to overcome these disadvantages and to accordingly process commercially available sodium with sodium peroxide, using powerful agitation and a temperature of 150 to 300 degrees centigrade, but preferably 200 to 300 degrees centigrade, and then separate the oxidized calcium by filtration.

In accordance with a preferred form of embodiment of the invention, the sodium is first heated to about 110–120 degrees centigrade, the peroxide being then added to the melted sodium under agitation, either all at once or in separate fractions. The temperature of the strongly agitated mixture (due to the low calcium content) is then raised to about 200–300° C., which temperature is maintained for a time long enough for the action of the peroxide on the calcium to be as thorough as possible, the mixture being then lowered to a temperature of about 110° C. and then filtered to eliminate the calcium oxide formed.

Considering first of all the quantity of peroxide, good results have been obtained by using about eight to ten times, or up to twenty times, the stoichiometric quantity of peroxide resulting from the reaction:

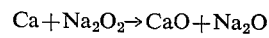

$$Ca + Na_2O_2 \rightarrow CaO + Na_2O$$

Although this surplus quantity is not necessary from the point of view of the oxidation reaction as such, it is essential on account of the peroxide that disperses into the melted sodium, i.e. because of the contact between solid and liquid, in view of the very low calcium content of even the commercially available type of sodium.

The surplus peroxide results in the following secondary reaction:

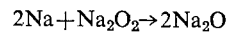

$$2Na + Na_2O_2 \rightarrow 2Na_2O$$

and the monoxide formed exerts a favorable effect when ultimate filtration takes place.

Considering next the quality of the peroxide to be used, recourse may be had to commercially available sodium peroxide, such as that available in the form of grains accepted by a 0.50 mm. or even a 0.25 mm. sieve and titrating 97% of $Na_2O_2$.

From a number of preliminary tests, the experimental conditions and results of which are shown in Table I below, it has been concluded, for given filtration conditions, that the stronger the agitation the higher the degree of purification, and that, as a general rule, by appropriately determining the various conditions under which the experiments are conducted it is possible to reach or even drop below the lower limit of 10 p.p.m. of calcium referred to precedingly.

TABLE I

| Quantity of sodium (kg.) | Operating time (hrs.) | | | Agitating speed (r.p.m.) | Sodium peroxide | | Temperature | | | Calcium (p.p.m.) | |
| --- | --- | --- | --- | --- | --- | --- | --- | --- | --- | --- | --- |
| | Temperature rise | Reaction | Cooling | | Total weight g. | Number of additions | Introduction of Na$_2$O$_2$ | Reaction | Filtration | Raw Na | Purified Na |
| 1.96 | 1 | 2 | 2 | 300 | 13.6 | 6 | 250 | 250 | 130 | 422 | 19 |
| 2.04 | 1 | 2 | 2 | 5,500 | 16.5 | 4 | 250 | 250 | 130 | 422 | 13 |
| 2.89 | 1 | ½ | 0 | 5,500 | 24 | 1 | 250 | 250 | 250 | 422 | 63 |
| 2.89 | 1 | 1 | 0 | 5,500 | 24 | 1 | 250 | 250 | 250 | 422 | 24 |
| 2.89 | 1 | 2 | 0 | 5,500 | 24 | 1 | 250 | 250 | 250 | 422 | 23 |
| 2.18 | 1 | 2 | 2 | 5,600 | 18.5 | 1 | 150 | 300 | 110 | 432 | 10 |
| 2.04 | 2 | 2 | 2 | 7,900 | 17 | 1 | 150 | 300 | 110 | 432 | 7 |

Apparatus for performing the method hereinbefore disclosed in connection with the present invention, is provided with a reaction chamber A comprising agitation means, temperature adjustment means and monitoring means, and with a filtration unit B.

In a preferred embodiment shown diagrammatically in the accompanying drawing, said reaction chamber A is of substantially cylindrical shape and is made for instance of stainless steel or the like and arranged partly within a skirt-shaped support 2 which is made of ordinary steel, for example, and includes said temperature adjustment means, namely means for heating and cooling the chamber. Said monitoring means, in conjunction with machinery for driving said agitation means, may be provided at the top of chamber A, which is the portion thereof projecting from support 2.

Considering first the agitation means referred to, same may consist, as shown, of a system of two club propellers 3 and 4 mounted on a common vertical shaft 5 driven by the output shaft 6 of said drive machinery, the latter consisting in turn, for instance, of a motor 7 capable of driving shaft 5 at different speeds included, say, between 1,500 and 6,000 revolutions per minute.

Motor 7 can be mounted on a plate 8 formed with a passageway therethrough (not shown) for shaft 6, and plate 8 is secured to an annular flange 9 bounding a cylindrical opening 10 concentric with the symmetry axis, with which axis shaft 5 is coaxial.

In this form of embodiment, the action of said agitation means of chamber A is supplemented by a plurality of stationary vertical blades 11, numbering four for example, secured to the inner surface of chamber A along generating lines thereof, said blades cooperating with the propellers 3 and 4 in order to improve the agitating effect.

Considering next said monitoring means, these consist basically of level gauges 12 and a thermometer 13, and these level gauges consist for example of insulated electrodes or similar means placed at different levels and generating an electrical signal when the sodium level inside the reaction chamber reaches them in turn.

The sodium to be purified and the peroxide and gas which must surmount the reaction mixture (and which must compulsorily be neutral under the reaction mixture) are admitted into the chamber A through inlet pipes 14, 15 and 16 connected respectively to a source of melted sodium, a source of peroxide and a source of inert gas such as nitrogen, helium or argon.

The source of melted sodium may be a tank 17, made of ordinary steel for example, connected to pipe 14 through a line 18 incorporating a valve 19, means being provided for heating line 18 and valve 19 to avoid clogging through solidification of the sodium. The sodium can be transferred from tank 17 to chamber A in any convenient manner, for example either by positioning tank 17 at a higher level than the chamber (as shown in the figure) or by causing different pressures to prevail in the tank and the chamber, or else by the use of pumping means, it being further understood that means are provided for melting the sodium inside tank 17 or for maintaining it in the molten state therein. Tank 17 additionally includes a drain valve 20.

The source of peroxide may consist of a hopper-shaped tank 21 comprising valve or distributor means 21a enabling the peroxide to be conveyed into chamber A either in a single operation or in several successive fractions.

Lastly, the source of gas may consist of a tank containing an inert gas such as nitrogen, dried argon or helium under pressure (not shown), and connected via a valve 22 to said pipe 16, which is in turn vented to the open atmosphere through a valve 23.

The chamber A is positioned within support 2 through an upper annular horizontal flange 24 formed on the support and against which said chamber is applied via a circular flange 25 thereon.

The heating means associated to the skirt-shaped support 2 consist of a set of burners 26 connected through a line 27 to a source of fuel gas (not shown), while said cooling means consist of a fan 28 placed in communication with the interior of said support via a line 29.

The reaction chamber A hereinbefore described is connected to a filtration set generally designated by the letter B and comprising basically a pre-filtering device for effecting a rough filtration and a filter for effecting fine filtration (not shown), and this unit B is connected into a conduit 30 linking chamber A with a tank 51 for collecting the purified sodium, said conduit 30 further communicating with chamber A via a valve 52.

Heating means, not shown, are provided for heating valve 52, the conduit 30, and the filtration unit B during transfer of the sodium to tank 51, whereby to avoid any clogging through solidification of the sodium.

It may be necessary in certain cases to sample the mixture contained in chamber A, and the latter is accordingly provided with a sampling device generally designated by reference numeral 58.

The sampling device 58, which communicates with the chamber through a conduit 59, consists basically, like said filtration unit B, of a pre-filtering unit 60 for effecting rough filtration and a filter 61 for effecting fine filtration, a chamber 62 being further provided for collecting the filtered sodium.

Conduit 59 communicates with said pre-filtering unit, said filter and chamber 62 through a valve 63, a pressurized-nitrogen inlet 64 being provided to drain valve 63 and conduit 59 prior to each sampling, since the sodium retained in said conduit may not have reacted properly with the peroxide.

Apparatus devised as described hereinabove will permit of ridding commercially available electrolytic sodium intended for nuclear applications of any calcium it contains, the principle of operation of such apparatus being as follows:

Tank 17 having been filled with sodium the temperature of which is raised to about 110–120° C., and chamber A (the inside temperature of which is likewise in the neighbourhood of 110–120° C.) having been filled with a nitrogen atmosphere, valve 19 is opened so as to transfer the melted sodium into chamber A, the level of the melted sodium being checked by means of gauges 12. During this filling operation, the agitation means are operated in order to avoid cold spots. The peroxide contained in tank 21 is then introduced, following which the heating device 26 is used to raise the temperature of the sodium contained in the chamber to about 200–300° C. The agitation process and the temperature of 200 to 300° C. are maintained for about one to two hours, after which the melted sodium is cooled to approximately 110° C. by means of the air circulation produced by fan 28. Lastly, after the temperature of valve 52, conduit 30 and filtration unit B has been brought to a value precluding solidification of the sodium, said valve 52 is opened and the processed sodium is transferred to tank 51 via filtration unit B.

The emptying and filling of chamber A can be monitored by means of the gauges 12.

Apparatus as hereinbefore described, comprising a chamber A with a capacity of 250 kg. was used to conduct a number of tests, under conditions and with results as set forth in Table II below.

TABLE II

| Test run | Sodium (kg.) | Reaction time (min.) | Agitation speed (r.p.m.) | Temperature (0° C.) | | Analysis of purified Na | |
|---|---|---|---|---|---|---|---|
| | | | | Reaction | Filtration | Ca (p.p.m.) | Ba (p.p.m.) |
| 1 | 250 | 60 | 1,500 | 300 | 110 | <10 | <10 |
| 2 | 250 | 60 | 1,500 | 250 | 110 | <10 | <10 |
| 3 | 250 | 120 | 1,500 | 250 | 110 | <10 | <10 |
| 4 | 250 | 90 | 1,500 | 200 | 110 | <10 | <10 |
| 5 | 250 | 60 | 1,500 | 200 | 110 | <10 | <10 |
| 6 | 250 | 60 | 1,500 | 200 | 170 | 12 | <10 |
| 7 | 250 | 60 | 1,500 | 200 | 110 | <10 | <10 |
| 8 | 250 | 180 | 1,500 | 200 | 110 | <10 | <10 |
| 9 | 250 | 30 | 1,500 | 200 | 100 | <10 | <10 |
| 10 | 250 | 60 | 1,500 | 200 | 110 | <10 | <10 |

An examination of Table II shows that the subject method and apparatus of this specification permit of lowering the calcium content of commercially available electrolytic sodium to below 10 p.p.m., namely to approximately 2 to 7 p.p.m.

Table II also reveals another important advantage of the present invention, namely that the means described hereinabove result in the barium content of the processed sodium being reduced to below 10 p.p.m., in particular when this sodium has been prepared by electrolysing a ternary mixture consisting of sodium chloride, calcium chloride and barium chloride.

What is claimed is:

1. A process for purifying sodium containing minor amounts of an impurity consisting of calcium, barium or both which comprises adding sodium peroxide to the melted sodium, heating the melt under vigorous stirring at a temperature not higher than about 300° C. for a time sufficient to enable the reaction to take place and removing the solid precipitate containing the oxidized impurity from said melt.

2. A process according to claim 1 wherein said melt is heated at a temperature ranging from 200° C. to 300° C.

3. A process according to claim 1 wherein said adding of sodium peroxide to said melted sodium is accomplished at a temperature from about 110–120° C.

4. A process according to claim 1 wherein the removing of said solid precipitate containing the oxidized impurity is accomplished by filtration at a temperature of about 110–120° C.

5. A process according to claim 1 wherein said sodium peroxide is added to said melted sodium in amounts less than twenty times the stoichiometrical amount required for the complete oxidation of the impurity contained in said melted sodium.

6. A process according to claim 1 wherein said sodium peroxide is added to said melted sodium in amounts ranging from eight to ten times the stoichiometrical amount required for the complete oxidation of the impurity contained in said melted sodium.

7. A process according to claim 1 wherein the used sodium peroxide is a commercially available sodium peroxide titrating 97% of $Na_2O_2$.

8. A process according to claim 7 wherein said sodium peroxide is used under the form of grains passing through 0.25 to 0.50 millimeter sieves.

References Cited

UNITED STATES PATENTS

| | | | |
|---|---|---|---|
| 2,054,316 | 9/1936 | Gilbert | 75—66 |
| 2,727,817 | 12/1955 | Whaley | 75—66 X |
| 2,863,757 | 12/1958 | Altimer et al. | 75—66 |

L. DEWAYNE RUTLEDGE, Primary Examiner

H. W. TARRING II, Assistant Examiner

U.S. Cl. X.R

75—63